United States Patent
Lee et al.

(10) Patent No.: US 9,575,362 B2
(45) Date of Patent: Feb. 21, 2017

(54) BACKLIGHT ASSEMBLY COMPRISING A PLURALITY OF FIRST AND SECOND COLOR PATTERNS AND DISPLAY DEVICE INCLUDING THE SAME

(71) Applicant: Samsung Display Co., Ltd., Yongin, Gyeonggi-Do (KR)

(72) Inventors: Sang Won Lee, Seoul (KR); Ju Hee Song, Anyang-si (KR); Min Young Song, Asan-si (KR); Ji Won Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 218 days.

(21) Appl. No.: 14/242,605

(22) Filed: Apr. 1, 2014

(65) Prior Publication Data

US 2015/0160513 A1 Jun. 11, 2015

(30) Foreign Application Priority Data

Dec. 6, 2013 (KR) .................. 10-2013-0151532

(51) Int. Cl.
*G02F 1/1335* (2006.01)

(52) U.S. Cl.
CPC ... *G02F 1/133609* (2013.01); *G02F 1/133602* (2013.01); *G02F 1/133603* (2013.01); *G02F 1/133605* (2013.01)

(58) Field of Classification Search
CPC .................. G02F 1/133609; G02F 1/133605; G02F 1/133602
See application file for complete search history.

(56) References Cited

U.S. PATENT DOCUMENTS

| 7,629,957 | B2 | 12/2009 | Kim | |
|---|---|---|---|---|
| 2004/0264212 | A1* | 12/2004 | Chung | G02F 1/133603 362/561 |
| 2007/0159851 | A1 | 7/2007 | Lee et al. | |
| 2013/0188114 | A1 | 7/2013 | Sugaya | |

FOREIGN PATENT DOCUMENTS

| JP | 2007-193124 | 8/2007 |
|---|---|---|
| KR | 10-0780193 A | 11/2007 |
| KR | 10-0819652 A | 4/2008 |
| KR | 10-2008-0064486 A | 7/2008 |

(Continued)

*Primary Examiner* — Paul Lee
(74) *Attorney, Agent, or Firm* — Innovation Counsel LLP

(57) ABSTRACT

A backlight assembly and a display device including the same are provided. A backlight assembly includes a light source portion including a plurality of light sources having a first light source and a second light source, the second light source emits light of a color that is different from a color of light emitted from the first light source, and a reflective member that is adjacent to an edge portion of the light source portion, wherein the reflective member includes a base layer including a first region that faces the first light source and a second region that faces the second light source, and a plurality of color patterns including a plurality of first color patterns that are positioned on the first region of the base layer and a plurality of second color patterns that are positioned on the second region of the base layer, wherein the plurality of first color patterns and the plurality of second color patterns have different colors.

19 Claims, 18 Drawing Sheets

(56) References Cited

FOREIGN PATENT DOCUMENTS

| | | |
|---|---|---|
| KR | 10-2008-0070530 A | 7/2008 |
| KR | 10-2008-0110357 A | 12/2008 |
| KR | 10-2009-0019208 A | 2/2009 |
| KR | 10-2011-0107685 A | 10/2011 |
| KR | 10-2012-0067550 A | 6/2012 |
| KR | 10-2012-0129092 A | 11/2012 |
| KR | 10-2013-0003660 A | 1/2013 |
| KR | 10-2013-0068239 A | 6/2013 |

* cited by examiner

BACKLIGHT ASSEMBLY COMPRISING A PLURALITY OF FIRST AND SECOND COLOR PATTERNS AND DISPLAY DEVICE INCLUDING THE SAME

CROSS-REFERENCE TO RELATED APPLICATIONS

This application is based on and claims priority from Korean Patent Application No. 10-2013-0151532, filed on Dec. 6, 2013 in the Korean Intellectual Property Office, the disclosure of which is incorporated herein in its entirety by reference.

BACKGROUND

1. Field of the Invention

The present invention relates to a backlight assembly and a display device including the same.

2. Description of the Prior Art

A display device is a device that displays data. The display device may be a liquid crystal display, an electrophoretic display, an organic light emitting display, an inorganic electroluminescent (EL) display, a field emission display, a surface-conduction electron-emitter display, a plasma display, or a cathode ray display.

Among such display devices, a liquid crystal display is a display device in which a liquid crystal layer is arranged between two transparent substrates, and light permeability for each pixel is adjusted by driving of the liquid crystal layer to display a desired image.

Because liquid crystals themselves are unable to emit light in the liquid crystal display, a separate light source portion is installed in the liquid crystal display, and contrast is implemented by adjusting the strength of light that passes through liquid crystals installed in each pixel. Here, the backlight assembly including a light source portion is an important component that determines picture quality, such as luminance and uniformity of the liquid crystal device.

The backlight assembly generally includes a light source portion, a reflective plate, a diffusion plate, a light guide plate, and various optical sheets. Further, backlight assemblies may be classified into a direct type or an edge type depending on the position of the light source portion. A direct type backlight assembly includes a light source portion that is arranged to face the lower surface of the diffusion plate, and an edge type backlight assembly includes a light source portion that is arranged to face the side surface of the light guide plate.

SUMMARY

A backlight assembly is provided that can prevent color stain from occurring on the edge portion through arrangement of a reflective member having a plurality of color patterns on an edge portion of a light source portion.

Further, a display device is provided which can prevent color stain from occurring on the edge portion through arrangement of a reflective member having a plurality of color patterns on an edge portion of a light source portion.

In one aspect a backlight assembly includes a light source portion including a plurality of light sources having a first light source and a second light source, the second light source emits light of a color that is different from a color of light emitted from the first light source, and a reflective member that is adjacent to an edge portion of the light source portion, wherein the reflective member includes a base layer including a first region that faces the first light source and a second region that faces the second light source, and a plurality of color patterns including a plurality of first color patterns that are positioned on the first region of the base layer and a plurality of second color patterns that are positioned on the second region of the base layer, wherein the plurality of first color patterns and the plurality of second color patterns have different colors.

The color of the plurality of first color patterns may be substantially in a complementary color relationship with the color of the light that is emitted from the first light source, and the color of the plurality of second color patterns may be substantially in a complementary color relationship with the color of the light that is emitted from the second light source.

The color of light emitted from first light source may be magenta, and the color of light emitted from the second light source may be green.

The color of the light that is emitted from the first light source and the color of the light that is emitted from the second light source may be in a complementary color relationship.

The color of the plurality of first color patterns may be substantially the same as the color of light that is emitted from the second light source, and the color of the plurality of second color patterns may be substantially the same as the color of light that is emitted from the first light source.

The plurality of color patterns may be positioned on one surface of the base layer, and a ratio of an area of an interface between the base layer and the plurality of color patterns to an area of the one surface of the base layer may become lower toward a boundary portion between the first region and the second region.

The first light source and the second light source may be adjacent to the boundary portion and may be spaced apart from the boundary portion by an equal distance.

A size of the plurality of color patterns may become smaller toward a boundary portion between the first region and the second region.

The plurality of color patterns may be circular, and a gap distance between centers of the plurality of color patterns that are adjacent to each other may be constant.

The backlight assembly may further comprise a diffusion plate that is positioned on the light source portion, wherein the plurality of color patterns may be formed on a region that is adjacent to the diffusion plate.

A gap distance between the plurality of color patterns that are adjacent to each other may be increased toward a boundary portion between the first region and the second region.

The plurality of color patterns may be spaced apart from each other at equal intervals, and be positioned on center portions of the first region and the second region.

The plurality of light sources may be arranged in a matrix shape, and the first light source and the second light source may be alternately arranged in row and column directions.

In another aspect a backlight assembly includes a light source portion including a plurality of light sources having a first light source and a second light source, the second light source emits light of a color that is different from a color of light emitted from the first light source, and a reflective member that is adjacent to an edge portion of the light source portion, wherein the reflective member includes a base layer including a first region and a second region that is adjacent to the first region, and a plurality of color patterns including a plurality of first color patterns that are positioned on the first region of the base layer and a plurality of second color patterns that are positioned on the second region of the base layer, wherein a color of the plurality of first color patterns is substantially in a complementary color relationship with a color of the light that is emitted from the first light source, and a color of the plurality of second color patterns is substantially in a complementary color relationship with a color of the light that is emitted from the second light source.

The first region may face the first light source, and the second region may face the second light source.

The color emitted by the first light source may be magenta, and the color emitted by the second light source may be green.

The plurality of color patterns may be positioned on one surface of the base layer, and a ratio of an area of an interface between the base layer and the plurality of color patterns to an area of the one surface of the base layer may become lower toward a boundary portion between the first region and the second region.

In still another aspect a display device includes a display panel displaying an image, and a backlight assembly providing light to the display panel, wherein the backlight assembly includes a light source portion including a plurality of light sources having a first light source and a second light source, the second light source emits light of a color that is different from a color of light emitted from the first light source, and a reflective member that is adjacent to an edge portion of the light source portion, wherein the reflective member includes a base layer including a first region that faces the first light source and a second region that faces the second light source, and a plurality of color patterns including a plurality of first color patterns that are positioned on the first region of the base layer and a plurality of second color patterns that are positioned on the second region of the base layer, wherein the plurality of first color patterns and the plurality of second color patterns have different colors.

The color of the plurality of first color patterns may be substantially in a complementary color relationship with the color of the light that is emitted from the first light source, and the color of the plurality of second color patterns may be substantially in a complementary color relationship with the color of the light that is emitted from the second light source.

The color of light emitted from the first light source may be magenta, and the color of light emitted from the second light source may be green.

According to the example embodiments of the present disclosure, at least the following effects can be achieved.

That is, because the reflective member having the plurality of color patterns is arranged on the edge portion of the light source portion, a color stain can be prevented from occurring on the edge portion of the display panel.

Additional advantages, subjects, and features will be set forth in part in the description which follows and in part will become apparent to those having ordinary skill in the art upon examination of the following.

The effects according to the present disclosure are not limited to the contents as exemplified above, but further various effects are included in the description.

BRIEF DESCRIPTION OF THE DRAWINGS

The above and other objects, features and advantages will be more apparent from the following detailed description taken in conjunction with the accompanying drawings, in which.

DETAILED DESCRIPTION OF THE EMBODIMENTS

Figure 1:
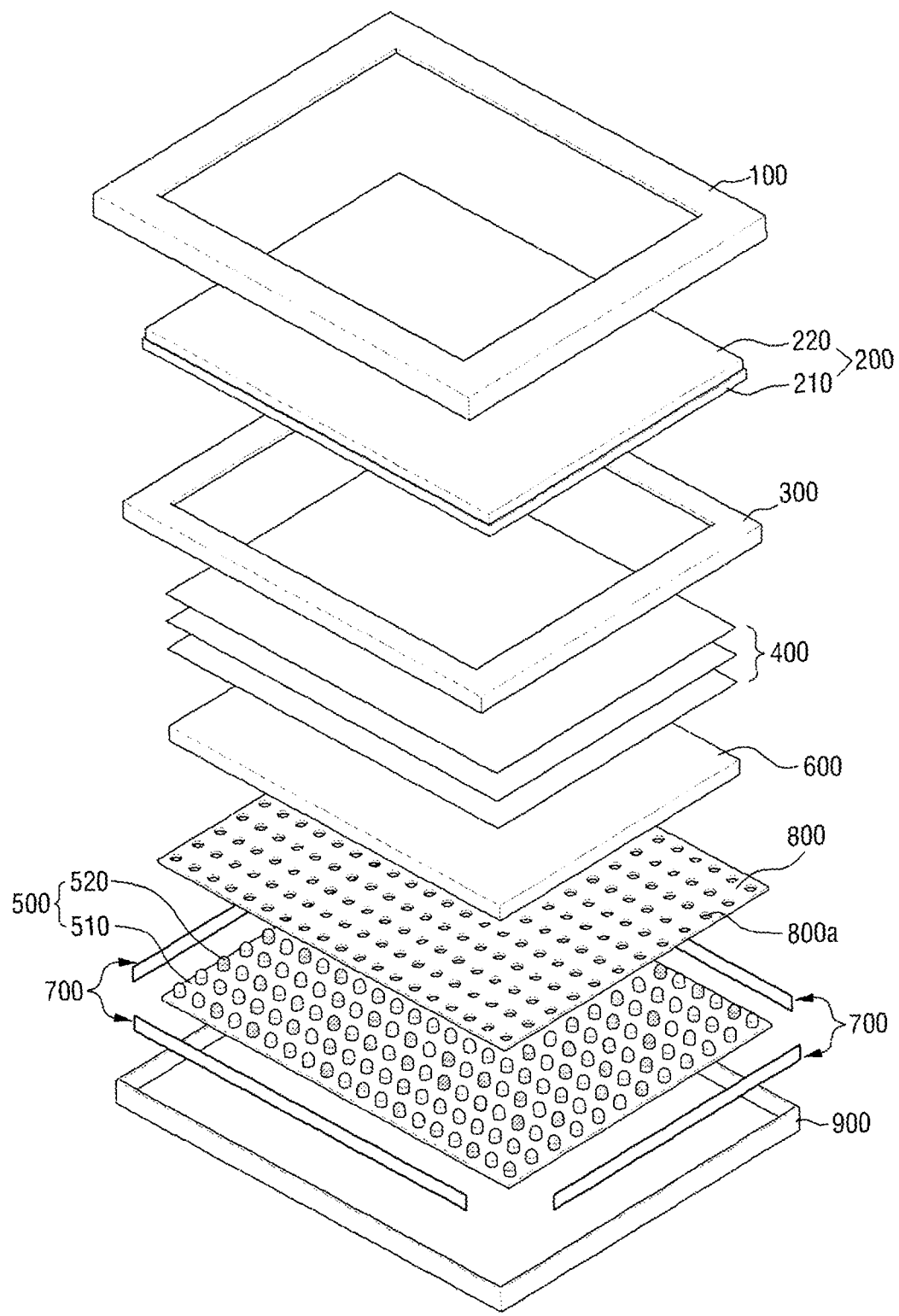
FIG. 1 is an exploded perspective view of a display device according to an embodiment.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Thus, in some embodiments, well-known structures and devices are not shown in order not to obscure the description of the example embodiment with unnecessary detail. Like numbers refer to like elements throughout. In the drawings, the thickness of layers and regions are exaggerated for clarity.

It will be understood that when an element or layer is referred to as being "on," or "connected to" another element or layer, it can be directly on or connected to the other element or layer, or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Example embodiments described herein will be described referring to plan views and/or cross-sectional views by way of ideal schematic views. Accordingly, the example views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

To stably provide light to a large-scale display panel, direct type backlight assemblies are mainly used. In this case, in order to achieve high color gamut, a method for configuring a light source portion of a direct type backlight assembly using two kinds of light sources that emit light of different colors has been widely used.

In the light source portion of the direct type backlight assembly that includes two kinds of light sources emitting light of different colors, it is important to uniformly mix the light of two different colors as a whole. That is, in order to display an image having no color stain on a display panel, it is necessary that the light source portion provides light of uniformly mixed color to the display panel.

According to this structure, one kind of light source is surrounded by the other kind of light source on the center portion of the light source portion, and thus the light of two colors emitted from two kinds of light sources can be appropriately mixed. Accordingly, light of white color may be generated on the center portion of the light source portion, and this white light may be provided to the display panel through a diffusion plate and an optical sheet.

However, on an edge portion of the light source portion, one kind of light source is not completely surrounded by the other kind of light source. That is, on one side portion of the light source that is positioned on the edge portion of the light source portion, a side wall of a bottom chassis or a reflective plate is positioned rather than the other light source, and thus the light of two kinds of colors may not be appropriately mixed as on the center portion of the light source portion. Accordingly, the light of different colors may be directly transferred to the display panel, and thus color stain, in which two kinds of colors are visually recognized, may occur on the edge portion of the display panel.

Accordingly, a backlight assembly is needed that can prevent color stain from occurring on the edge portion through arrangement of a reflective member having a plurality of color patterns on an edge portion of a light source portion.

Further, a display device is needed that can prevent color stain from occurring on the edge portion through arrangement of a reflective member having a plurality of color patterns on an edge portion of a light source portion.

Hereinafter, example embodiments will be described with reference to the accompanying drawings.

FIG. 1 is an exploded perspective view of a display device according to an example embodiment. Referring to FIG. 1, a display device according to an example embodiment includes a display panel 200 and a backlight assembly. Further, the display device according to an example embodiment may further include a top chassis 100 and a bottom chassis 900.

The display panel 200 is a panel that displays data. The display panel 200 may be a liquid crystal display (LCD) panel, an electrophoretic display panel, an organic light emitting display (OLED) panel, a light emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. Hereinafter, as a display device according to an embodiment, a liquid crystal display is exemplified, and as a display panel 200, an LCD panel is exemplified. However, the display device and the display panel are not limited thereto, and various types of display devices and display panels may be used.

The display panel 200 may include a display region where an image is displayed and a non-display region where an image is not displayed. Further, the display panel 200 may include a first substrate 210, a second substrate 220 that faces the first substrate 210, and a liquid crystal layer (not illustrated) interposed between the first substrate 210 and the second substrate 220.

The first substrate 210 and the second substrate 220 may be in a cuboidal shape. For convenience in explanation, FIG. 1 illustrates the first substrate 210 and the second substrate 220 in the cuboidal shape. However, the shape of the first substrate 210 and the second substrate 220 is not limited thereto, but the first substrate 210 and the second substrate 220 may be manufactured in various shapes.

The liquid crystal layer may be interposed between the first substrate 210 and the second substrate 220. Further, between the first substrate 210 and the second substrate 220, a sealing member, such as a sealant, may be arranged along edge portions of the first substrate 210 and the second substrate 220 to attach and seal the first substrate 210 and the second substrate 220.

Although not illustrated in FIG. 1, the display panel 200 may include a driving portion and a flexible circuit board, which are attached to the first substrate 210 or the second substrate 220. The driving portion may apply various signals, such as driving signals required to display an image on the display region. The flexible circuit board may output various kinds of signals to the driving portion.

The backlight assembly may be arranged on a lower portion of the display panel 200. The backlight assembly may provide light to the display panel 200. The backlight assembly according to an example embodiment includes a light source portion 500 and a reflective member 700. The backlight assembly according to an embodiment of the present invention may further include a diffusion plate 600, an optical sheet 400, a reflective plate 800, and a mold frame 300.

The light source portion 500 may be arranged on a lower portion of (i.e., beneath) the diffusion plate 600. Specifically, the light source portion 500 may be interposed between the bottom chassis 900 and the diffusion plate 600. That is, the backlight assembly according to an example embodiment may be a direct type backlight assembly, and thus the light source portion 500 may be formed to overlap the display region of the display panel 200. The light source portion 500 may emit light and irradiate the diffusion plate 600 with the emitted light.

The light source portion 500 may include a circuit board 510 and a plurality of light sources 520.

The circuit board 510 may be interposed between the diffusion plate 600 and the bottom chassis 900 to support the plurality of light sources 520 and to transfer voltages and various signals to the plurality of light sources 520. The circuit board 510 may be in a cuboidal plate shape, and may be connected to a flexible circuit board to receive a dimming signal from the driving portion.

The plurality of light sources 520 may be mounted on the circuit board 510. The plurality of light sources 520 may receive voltages from outside of the backlight assembly to emit light.

The plurality of light sources 520 may be positioned on the same plane. In an example embodiment, the plurality of light sources 520 may be positioned on a plane that is parallel to a lower surface of the diffusion plate 600. The plurality of light sources 520 may be LEDs (Light Emitting Diodes), but are not limited thereto. The plurality of light sources 520 may mean all devices that can emit light. In an example embodiment, the plurality of light sources 520 may be arranged in the form of a matrix, but are not limited thereto. The arrangement of the plurality of light sources 520 may be modified depending on the shape of the display panel 200. The details of the plurality of light sources 520 will be described later.

The reflective member 700 may reflect the light that is incident from the light source portion 500 to the inside of the backlight assembly. The reflective member 700 may be adjacent to the edge of the light source portion 500. In an example embodiment, the reflective member 700 may be arranged along the edge of the light source portion 500. Further, the reflective member 700 may surround the edge of the light source portion 500.

A plurality of reflective members 700 may be provided. In an example embodiment, if the circuit board 510 has the cuboidal plate shape, the plurality of reflective members 700 may be arranged to correspond to four sides of the circuit board 510. However, the arrangement of the plurality of reflective members 700 is not limited thereto, and the plurality of reflective members 700 may be integrally formed to surround the light source portion 500. The details of the reflective members 700 will be described later.

The diffusion plate 600 may be positioned on the light source portion 500. Specifically, the diffusion plate 600 may be positioned between the light source portion 500 and the display panel 200. The diffusion plate 600 may serve to improve the luminance uniformity of the light that is incident from the light source portion 500.

The optical sheet 400 may be arranged on an upper portion of the diffusion plate 600. Specifically, the optical sheet 400 may be arranged between the display panel 200 and the diffusion plate 600. The optical sheet 400 may modulate the optical characteristics of the light that is emitted from the light source portion 500 and that passes through the diffusion plate 600. A plurality of optical sheets 400 may be provided to overlap each other. The plurality of optical sheets 400 may be stacked to supplement each other. For example, the optical sheets 400 may include a prism sheet.

The reflective plate 800 may be arranged on a lower side of the diffusion plate 600. Specifically, the reflective plate 800 may be interposed between the diffusion plate 800 and the light source portion 500. The reflective plate 800 may change a path of the light that is emitted from the light source portion 500 and travels in the direction of the bottom chassis 900, so that it is directed toward the diffusion plate 600.

The reflective plate 800 may include a plurality of insertion holes 800a. The plurality of insertion holes 800a may respectively be positioned to correspond to positions of the plurality of light sources 520. That is, the plurality of light sources 520 may be inserted into the plurality of insertion holes 800a, respectively.

The mold frame 300 may be arranged between the display panel 200 and the optical sheet 400. The mold frame 300 is engaged with the bottom chassis 900 to fix the optical sheet 400, the light source portion 500, the diffusion plate 600, the reflective member 700, and the reflective plate 800. Further, the mold frame 300 may come in contact with the edge portion of the display panel 200 to support and fix the display panel 200.

The top chassis 100 may cover the edge of the display panel 200, and surround the side surfaces of the display panel 200 and the backlight assembly. The bottom chassis 900 may accommodate the backlight assembly. The top chassis 100 and the bottom chassis 900 are engaged with each other to surround the display panel 200 and the backlight assembly. The top chassis 100 and the bottom chassis 900 may be made of a conductive material, for example, metal.

Figure 2:
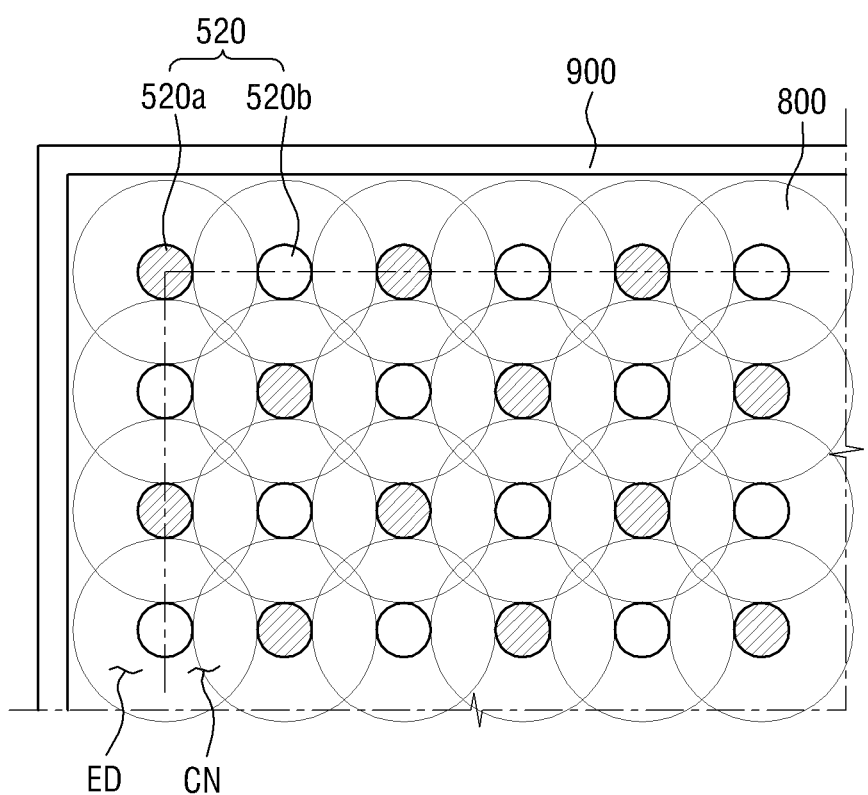
FIG. 2 is a plan view illustrating a light emitting region of a light source portion of the display device of FIG. 1.

Hereinafter, the light source portion of the backlight assembly according to an example embodiment will be described in more detail with reference to FIG. 2. FIG. 2 is a plan view illustrating a light emitting region of the light source portion 500 of the display device of FIG. 1.

Referring to FIG. 2, the plurality of light sources of the light source portion 500 may include first light sources 520a and second light sources 520b which emit light of a color that is different from the color of light of the first light sources 520a. Here, the color of the light that is emitted from the first light sources 520a and the color of the light that is emitted from the second light sources 520b may be in a complementary color relationship. In an example embodiment, the first light sources 520a may emit light of magenta color and the second light sources 520b may emit light of green color, but are not limited thereto.

The first light sources 520a and the second light sources 520b may be alternately arranged in row and column directions. In other words, the first light sources 520a and the second light sources 520b may be arranged along a line in the diagonal direction.

The light source portion 500 may include a center portion CN and an edge portion ED that surrounds the center portion CN.

The first light source 520a, which is positioned on the center portion CN of the light source portion 500, may be surrounded by the second light sources 520b. Further, the second light source 520b, which is positioned on the center portion CN of the light source portion 500, may be surrounded by the first light sources 520a. Accordingly, the light of the two colors emitted from the first light sources 520a and the second light sources 520b may be appropriately mixed. Because the two colors of the light emitted from the first light source 520a and the second light source 520b are in a complementary color relationship, white color may be generated through mixing of the light of two colors. The white light may be provided to the display panel 200 through the diffusion plate 600 and the optical sheet 400.

The first light source 520a, which is positioned at the edge portion ED of the light source portion 500, may not be completely surrounded by the second light sources 520b. Further, the second light source 520b, which is positioned on the edge portion ED of the light source portion 500 may not be completely surrounded by the first light sources 520a. That is, because on one side portion of the first light source 520a and the second light source 520b that are positioned at the edge portion ED of the light source portion 500 are adjacent to a side wall of the bottom chassis 900 rather than other light sources 520, the two colors of the light are not appropriately mixed as compared to the light the center portion CN of the light source portion 500. Accordingly, the light that is emitted from the first light source 520a and the light that is emitted from the second light source 520b are individually transferred to the display panel 200, and thus a color stain, in which the color of the light emitted from the first light source 520a and the color of the light emitted from the second light source 520b are visually recognized, may occur on the edge portion ED of the display panel.

In order to prevent the occurrence of the color stain, the reflective member 700 may be arranged on the edge portion ED of the light source portion 500. Hereinafter, the mutual relationship between the light source portion 500 and the reflective member 700 will be described in more detail.

Figure 3:
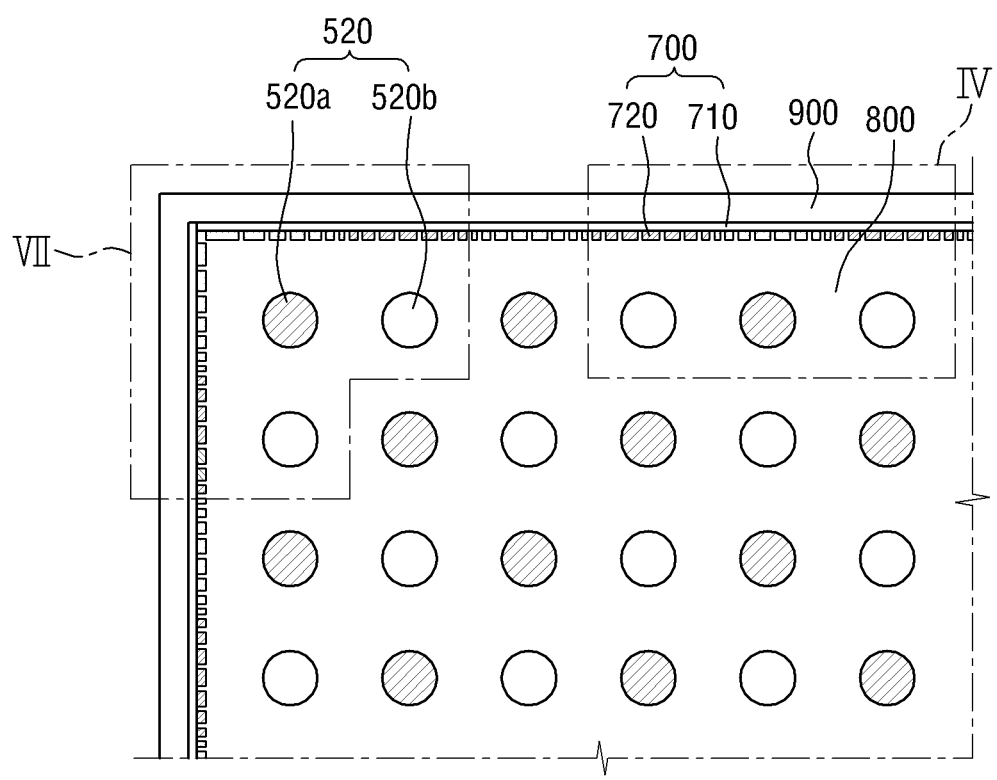
FIG. 3 is a plan view of a light source portion and a reflective member of the display device of FIG. 1.

FIG. 3 is a plan view of the light source portion 500 and the reflective member 700 of the display device of FIG. 1. Referring to FIG. 3, the reflective member 700 may be arranged adjacent to the edge portion ED of the light source portion 500. In an example embodiment, the reflective member 700 may be directly positioned on an inner surface of a side wall of the bottom chassis 900. That is, the reflective member 700 may be interposed between the side wall of the bottom chassis 900 and the plurality of light sources 520.

The reflective member 700 may include a base layer 710 and a plurality of color patterns 720. The base layer 710 may come in direct contact with the inner surface of the side wall of the bottom chassis 900, and may surround the edge portion ED of the light source portion 500. The plurality of color patterns 720 may be formed on a surface of the base layer 710 that faces the plurality of light source plurality of light sources 520.

In the reflective member 700, the shape and the arrangement of the plurality of color patterns 720 may have a constant rule across the entirety of the reflective member 700, or the shape and arrangement of the plurality of color patterns 720 may be different at a portion of the reflective member 700 adjacent a side of the light source portion 500 (a side portion) versus a portion of the reflective member 700 adjacent to a corner of the light source portion 500 (a corner portion).

Figure 4:
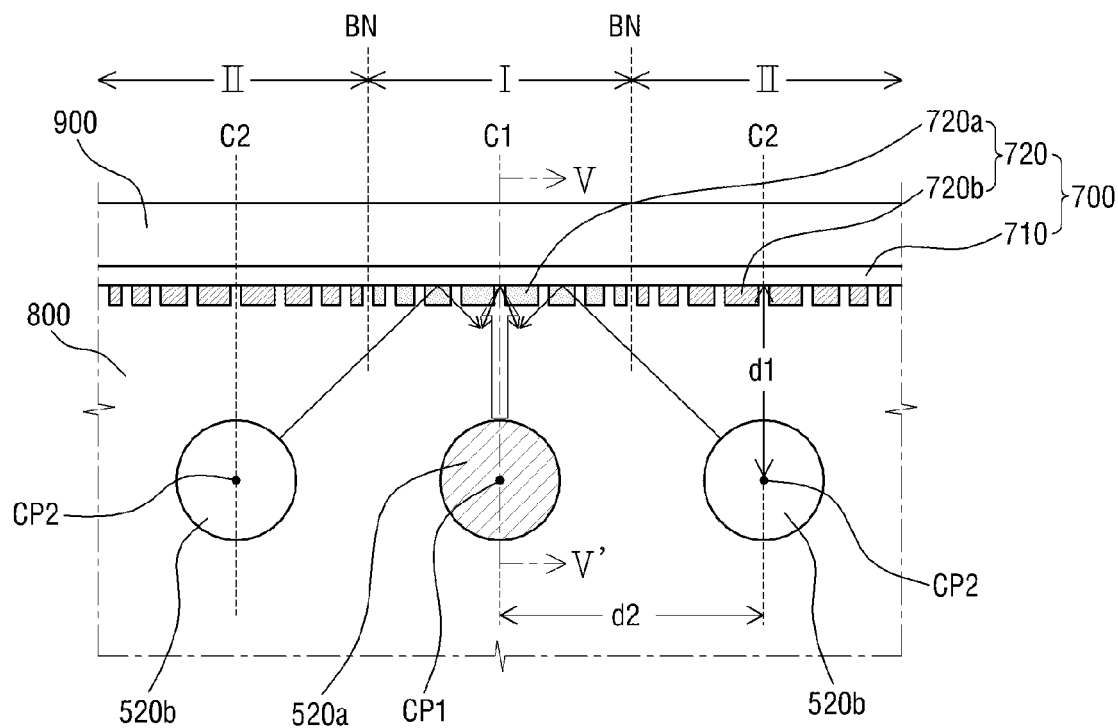
FIG. 4 is an enlarged plan view of portion IV of FIG. 3.

Hereinafter, the reflective member 700 that is positioned at the side portion of the light source portion 500 will be described in more detail with reference to FIGS. 4 to 6. FIG. 4 is an enlarged plan view of portion IV of FIG. 3, FIG. 5 is a cross-sectional view taken along line V-V' of FIG. 4, and FIG. 6 is a front view of a reflective member of FIG. 4.

Figure 5:
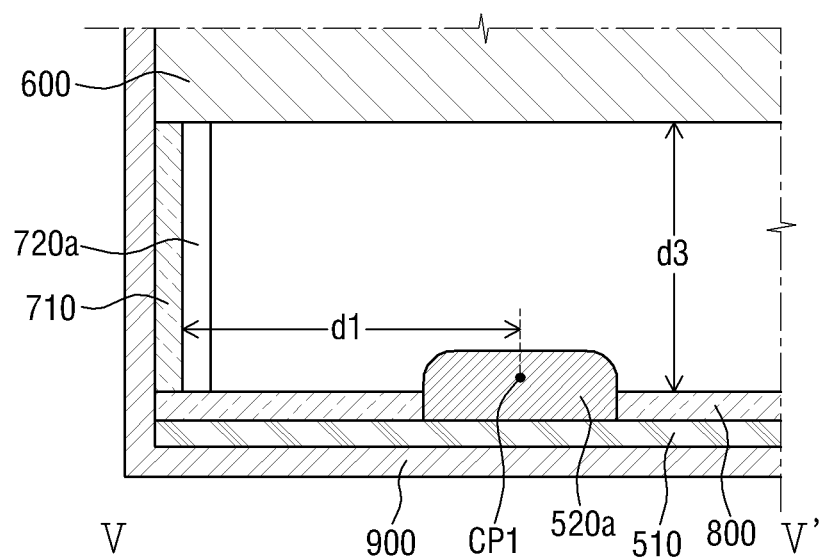
FIG. 5 is a cross-sectional view taken along line V-V' of FIG. 4.
Figure 6:
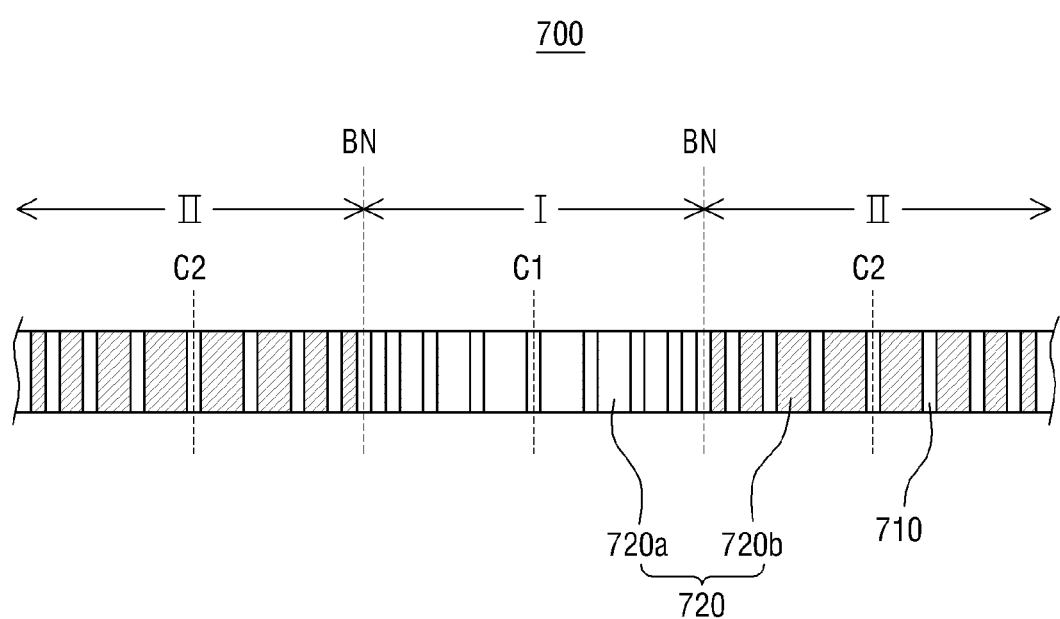
FIG. 6 is a front view of a reflective member of FIG. 4.

Referring to FIGS. 4 to 6, the base layer 710 may be positioned between the side wall of the bottom chassis 900 and the plurality of color patterns 720. The base layer 710 may include a reflective material. In an example embodiment, the base layer 710 may be made of a metallic material, but is not limited thereto. In another example embodiment, the base layer 710 may have diffusion reflection, but is not limited thereto. The base layer 710 may have mirror reflection.

The base layer 710 may include a first region I and a second region II. The first region I may be a region that faces the first light source 520a, and the second region II may be a region that faces the second light source 520b. The first region I may be a region where the influence of the first light source 520a is greater than the influence of the second light source 520b, and the second region II may be a region where the influence of the second light source 520b is greater than the influence of the first light source 520a. In other words, the first region I may be a region where the quantity of light, which is emitted from the first light source 520a and reaches the region, is larger than the quantity of light, which is emitted from the second light source 520b and reaches the region. The second region II may be a region where the quantity of light, which is emitted from the second light source 520b and reaches the region, is larger than the quantity of light, which is emitted from the first light source 520a and reaches the region.

The plurality of color patterns 720 may be positioned on one surface of the base layer 710. The ratio of an area of an interface between the base layer 710 and the plurality of color patterns 720 to an area of the one surface of the base layer 710 that includes the portion that is not an interface with a color pattern 720 may become lower toward a boundary line BN between the first region I and the second region II. Here, the first light source 520a and the second light source 520b, which are adjacent to the boundary line BN between the first region I and the second region II, may be spaced apart from the boundary line BN by an equal distance. In an example embodiment, the size of the plurality of color patterns 720 may become smaller toward the boundary line BN between the first region I and the second region II.

The plurality of color patterns 720 may include a plurality of first color patterns 720a and a plurality of second color patterns 720b.

The plurality of first color patterns 720a may be positioned on the first region I of the base layer 710. The plurality of first color patterns 720a may face the first light source 520a. Further, the plurality of first color patterns 720a may be positioned to be spaced apart from each other at a predetermined interval.

The plurality of first color patterns 720a may be symmetrically formed based on a line that extends between a first center point CP1 of the first light source 520a and the center of the first region I, that is, a first center line C1. Here, the first center line C1 may be a virtual line that is positioned on a shortest path between the first center point CP1 of the first light source 520a and one surface of the base layer 710. In an example embodiment, the ratio of the area of the interface between the base layer 710 and the plurality of first color patterns 720a to the area of the one surface of the base layer 710 that includes the portion that is not an interface with a color pattern 720 may become lower toward the boundary line BN between the first region I and the second region II. In an example embodiment illustrated in FIG. 4, the size of the plurality of first color patterns 720a may be decreased as going from the region (first center portion) that is adjacent to the first center line C1 to the region (boundary portion) that is adjacent to the boundary line BN between the first region I and the second region II.

The plurality of first color patterns 720a may be substantially in a complementary color relationship with the color of the light that is emitted from the first light source 520a. In an example embodiment, if the first light source 520a emits light of magenta color, the first color patterns 720a may have green color. Further, the color of the plurality of first color patterns 720a may be substantially the same as the color of the light that is emitted from the second light source 520b. In an example embodiment, the second light source 520b may emit light of green color, and the first color patterns 720a may also have green color.

The plurality of first color patterns 720a may include about 1 to 20% of pigment that is substantially in a complementary color relationship with the color of the light that is emitted from the first light source 520a, for example, green pigment. For example, the plurality of first color patterns 720a may include about 10% of pigment that is substantially in a complementary color relationship with the color of the light that is emitted from the first light source 520a. Further, the plurality of first color patterns 720a may be formed on the base layer 710 in a printing method. In this case, the printing thickness of the first color pattern 720a may be about 5 to 30 μm. Further, the printing width of the first color pattern 720a may be about 100 to 1000 μm. Further, the gap distance between the adjacent first color patterns 720a may be about 100 to 1000 μm.

The plurality of second color patterns 720b may be positioned on the second region II of the base layer 710. The plurality of second color patterns 720b may face the second light source 520b. Further, the plurality of second color patterns 720*b* may be positioned to be spaced apart from each other at a predetermined interval.

The plurality of second color patterns 720*b* may be symmetrically formed based on a line that extends between a second center point CP2 of the second light source 520*b* and the center of the second region II, that is, a second center line C2. Here, the second center line C2 may be a virtual line that is positioned on a shortest path between the second center point CP2 of the second light source 520*b* and one surface of the base layer 710. In an example embodiment, the ratio of the area of the interface between the base layer 710 and the plurality of second color patterns 720*b* to the area of the one surface of the base layer 710 that includes the portion that is not an interface with a color pattern 720 may become lower toward the boundary line BN between the first region I and the second region II. In an example embodiment illustrated in FIG. 4, the size of the plurality of second color patterns 720*b* may be decreased as going from the region (second center portion) that is adjacent to the second center line C2 to the region (boundary portion) that is adjacent to the boundary line BN between the first region I and the second region II.

The plurality of second color patterns 720*b* may be substantially in a complementary color relationship with the color of the light that is emitted from the second light source 520*b*. In an example embodiment, if the second light source 520*b* emits light of green color, the second color patterns 720*b* may have magenta color. Further, the color of the plurality of second color patterns 720*b* may be substantially the same as the color of the light that is emitted from the first light source 520*a*. In an example embodiment, the first light source 520*b* may emit light of magenta color, and the second color patterns 720*b* may also have magenta color.

The plurality of second color patterns 720*b* may include about 1 to 20% of pigment that is substantially in a complementary color relationship with the color of the light that is emitted from the second light source 520*b*, for example, magenta pigment. For example, the plurality of second color patterns 720*b* may include about 10% of pigment that is substantially in a complementary color relationship with the color of the light that is emitted from the second light source 520*b*. Further, the plurality of second color patterns 720*b* may be formed on the base layer 710 in a printing method. In this case, the printing thickness of the second color pattern 720*b* may be about 5 to 30 μm. Further, the printing width of the second color pattern 720*b* may be about 100 to 1000 μm. Further, the gap distance between the adjacent second color patterns 720*b* may be about 100 to 1000 μm.

As described above, the plurality of first color patterns 720*a* and the plurality of second color patterns 720*b* may have different colors. In an example embodiment, the color of the plurality of first color patterns 720*a* and the color of the plurality of second color patterns 720*b* may be in a complementary color relationship with each other.

As described above, because the backlight assembly according to an example embodiment includes the reflective member 700, the color stain can be prevented from occurring on the edge portion ED of the light source portion 500.

Referring to FIG. 4, such a color stain prevention mechanism will now be described in detail. For convenience in explanation, it is assumed that the first light source 520*a* emits light of magenta color, the second light source 520*b* emits light of green color, and thus the first color patterns 720*a* have green color, and the second color patterns 720*b* have magenta color.

The quantity of light of magenta color, which is emitted from the first light source 520*a* and is irradiated onto the first center portion of the base portion 710 that is relatively close, is larger than the quantity of light of magenta color, which is emitted from the first light source 520*a* and is irradiated onto the boundary portion (near boundary line BN) of the base layer 710. Because the first color patterns 720*a* that are relatively large are positioned on the first center portion, the light of magenta color that is emitted from the first light source 520*a* is mostly absorbed by the first color patterns 720*a* having green color that is the complementary color of magenta color. However, on the portion where the plurality of first color patterns 720*a* are spaced apart from each other, the base layer 710 is exposed and is not covered by a color pattern 720, and the light that is reflected from the exposed base layer 710 has magenta color as it is. That is, the light of magenta color that is irradiated from the first light source 520*a* onto the first center portion of the base layer 710 may be mostly absorbed by the first color patterns 720*a*, and may be partially reflected from the portion where the first color patterns 720*a* are not positioned.

The light of green color that is emitted from two second light sources 520*b* that are adjacent to the first light source 520*a* may be reflected from not only the portion where the first color patterns 720*a* having green color are positioned but also the portion where the first color patterns 720*a* are not positioned as it is. In particular, if the strength spectrum by wavelengths of the light that is emitted from the second light source 520*b* is made to coincide with the reflectivity spectrum by wavelengths of the first color patterns 720*a*, the light that is emitted from the second light source 520*b* may not be absorbed by the first color patterns 720*a*, but may be reflected from one surface of the base layer 710.

As described above, the light of magenta color, which is reflected from the first center portion of the base layer 710 without being absorbed by the first center portion, may be mixed with the light of green color, which is emitted from two adjacent second light sources 520*b* and is reflected from the base layer 710, to produce white light. That is, the size and the arrangement of the first color patterns 720*a* may be appropriately adjusted so that the white light is uniformly generated on the first region I.

This mechanism may be applied to the boundary portion of the base layer 710 in the same manner. However, because the quantity of light that is emitted from the first light source 520*a* and reaches the boundary portion of the base layer 710 is almost the same as the quantity of light that is emitted from the second light source 520*b* and reaches the boundary portion of the base layer 710, color compensation may not be as needed as in the first center portion of the base layer 710. Accordingly, the first color patterns 720*a* may be arranged with a relatively smaller size. In particular, because no color compensation is required on the boundary line BN between the first region I and the second region II, the first color patterns 720*a* may not be positioned thereon.

Various factors may be taken into consideration to determine the shape and the arrangement of the first color patterns 720*a*. For example, if lenses included in the plurality of light sources 520 are side emitting lenses rather than top emitting lenses, the quantity of light that is irradiated onto the side portion, that is, in the direction of the base layer 710, becomes greater, and thus the gap distance between the plurality of color patterns 720, of which the sizes become large for the color compensation or which are adjacent to each other, may become short. Further, as the distance d1 measured from the plurality of light sources 520 positioned on the edge portion ED of the light source portion 500 to the base layer 710 becomes shorter, the quantity of light that reaches the base layer 710 becomes larger, and thus the gap distance between the plurality of color patterns 720, of which the sizes become large for the color compensation or which are adjacent to each other, may become short. Further, as the gap distance d2 between two adjacent light sources 520 that are positioned on the edge portion ED of the light source portion 500 becomes longer, the relative influence of light of any one color becomes higher, and in order to compensate for this, the gap distance between the plurality of color patterns 720, of which the sizes become large for the color compensation or which are adjacent to each other, may become short. Further, as the distance d3 measured from the reflective plate 800 to the diffusion plate 600 becomes shorter, a space in which light of two different colors can be mixed is decreased, and thus the gap distance between the plurality of color patterns 720, of which the sizes become large for the color compensation or which are adjacent to each other, may become short.

Figure 7:
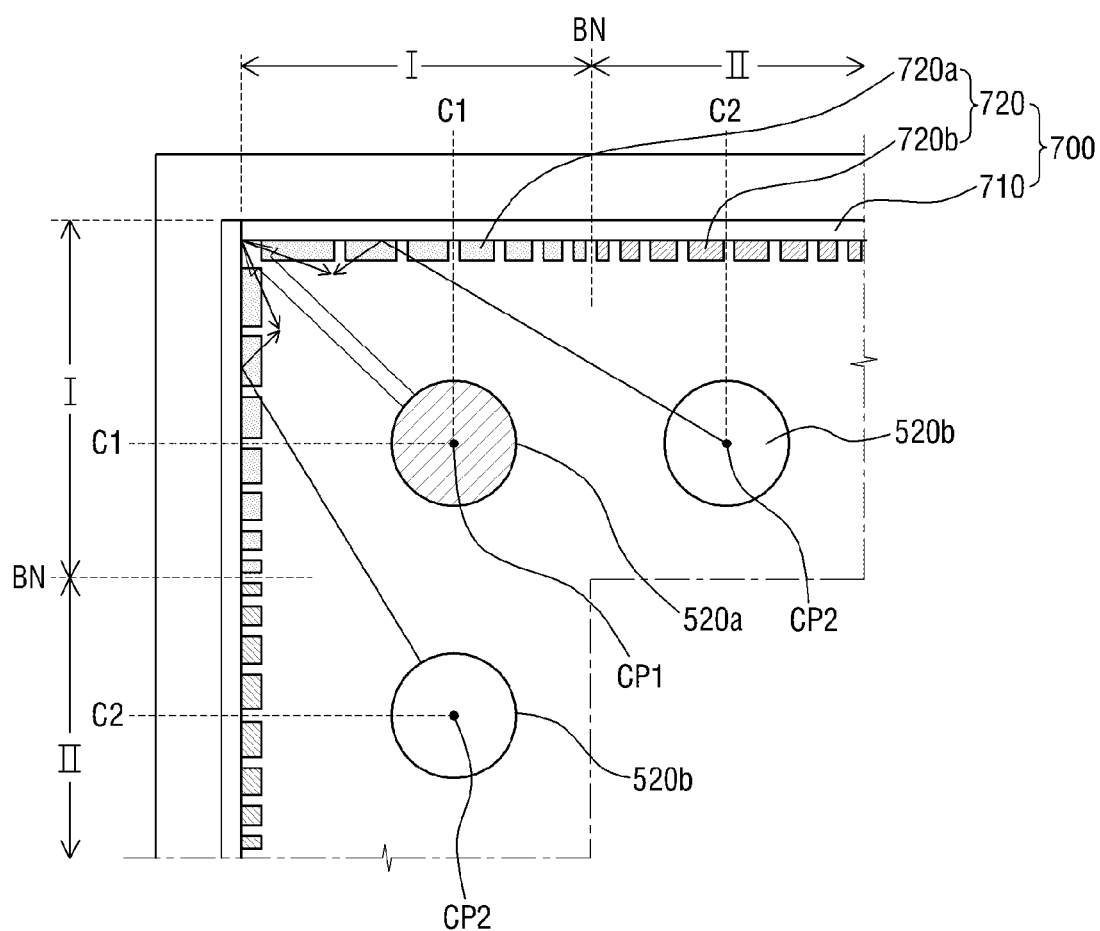
FIG. 7 is an enlarged plan view of portion VII of FIG. 3.

Hereinafter, the reflective member 700 positioned on the corner portion of the light source portion 500 will be described in more detail with reference to FIGS. 7 and 8. FIG. 7 is an enlarged plan view of portion VII of FIG. 3, and FIG. 8 is a front view of a reflective member of FIG. 7.

Figure 8:
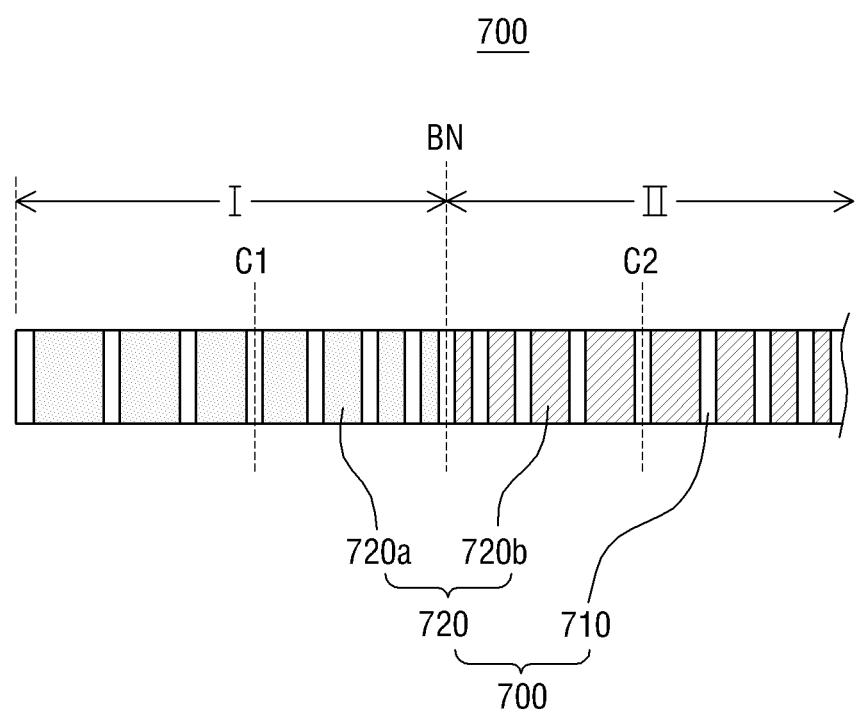
FIG. 8 is a front view of a reflective member of FIG. 7.

Referring to FIGS. 7 and 8, the shape and the arrangement of the plurality of color patterns 720 on the corner portion of the light source portion 500 are almost the same as those of the side portion of the light source portion 500, but may have the following differences.

The sizes of the plurality of color patterns 720 may be decreased as going from the corner of the light source portion 500 to the boundary portion between the first region I and the second region II. Further, the size of the color pattern 720, which is adjacent to the corner of the light source portion 500 among all the color patterns 720 included in the backlight assembly according to an example embodiment, may be largest. Because the relative influence of the light source 520 that is positioned on the corner portion of the light source portion 500 is much greater on the corner portion of the light source portion 500, additional color compensation is required in comparison to the side portion of the light source portion 500.

In an example embodiment illustrated in FIG. 7, the distance measured from the first light source 520a that is positioned on the corner portion of the light source portion 500 to the corner of the light source portion 500 is much shorter than the distance measured from the second light source 520b that is adjacent to the first light source 520a positioned on the corner portion of the light source portion 500 to the corner of the light source portion 500, and the relative influence of the first light source 520a on the second light source 520b on the corner portion of the light source portion 500 may be higher than that on the side portion of the light source portion 500. Accordingly, the size of the first color pattern 720a that is positioned adjacent to the corner of the light source portion 500 may be larger than the size of other first color patterns 720a. Further, on the corner portion of the light source portion 500, the first light source 520a and the second light source 520b are not symmetrically arranged as in the side portion of the light source portion 500, and thus the plurality of first optical patterns on the first region I that is positioned on the corner portion of the light source portion 500 may not be symmetrically arranged based on the first center line C1.

As described above, according to the backlight assembly according to an example embodiment, the reflective member 700 having a plurality of color patterns 720 is arranged on the edge portion ED of the light source portion 500, and thus the color stain can be prevented from occurring on the edge portion ED of the display panel 200.

Figure 9:
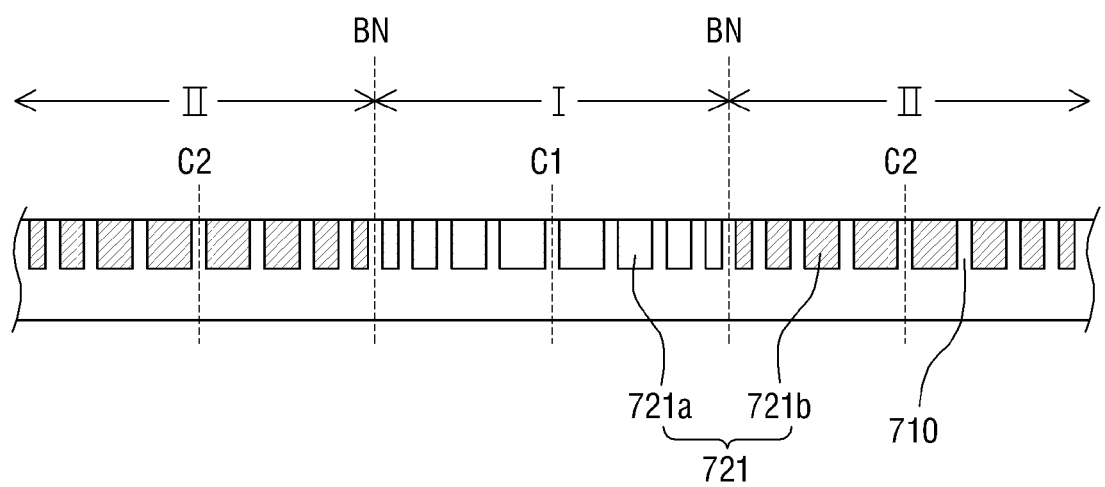
FIGS. 9 to 16 are front views of reflective members according to other embodiments.
Figure 10:
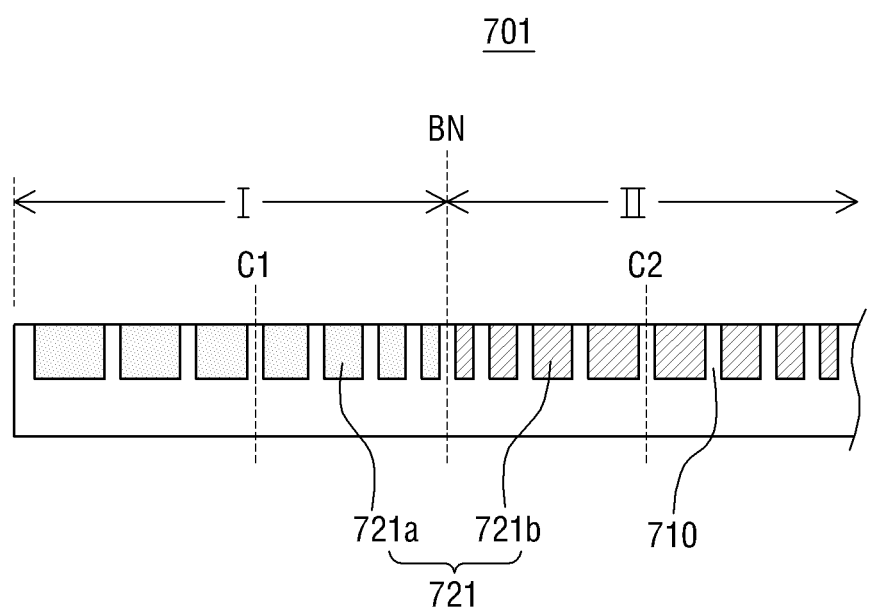

FIGS. 9 and 10 are front views of a side portion and a corner portion of a reflective member 701 according to another example embodiment. For convenience in explanation, the same reference numerals are used for elements that are substantially the same as the elements illustrated in the above-described drawings, and duplicate explanation thereof will be omitted.

Referring to FIGS. 9 and 10, a plurality of color patterns 721, that is, a plurality of first color patterns 721a and a plurality of second color patterns 721b, may be formed on one side of one surface of the reflective member 701. In an example embodiment, the plurality of color patterns 721 may be formed on a region of reflective member 701 that is adjacent to the diffusion plate 600. Further, the plurality of color patterns 721 may not be formed on a region of reflective member 701 that is adjacent to the reflective plate 800.

Because light emitted from the light source portion 500 travels in the direction of the diffusion plate 600, the upper end region of the base layer 710 (region that is adjacent to the diffusion plate 600) greatly contributes to the color stain in comparison to the lower end region of the base layer 710 (region that is adjacent to the reflective plate 800). Accordingly, by intensively arranging the plurality of color patterns 721 on the upper end portion of the base layer 710, the color stain can be prevented from occurring.

Figure 11:
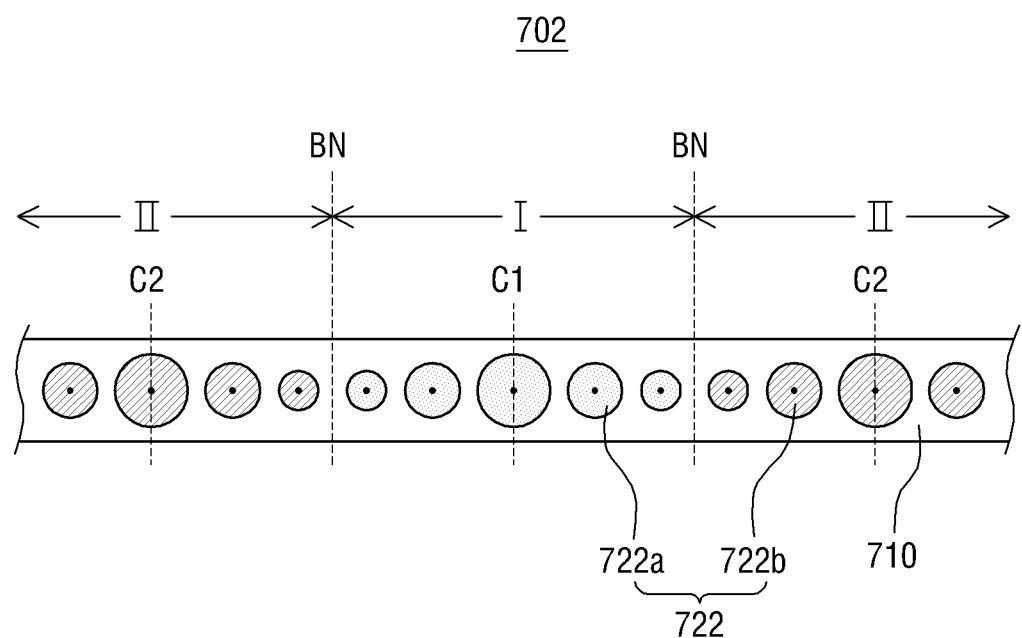
Figure 12:
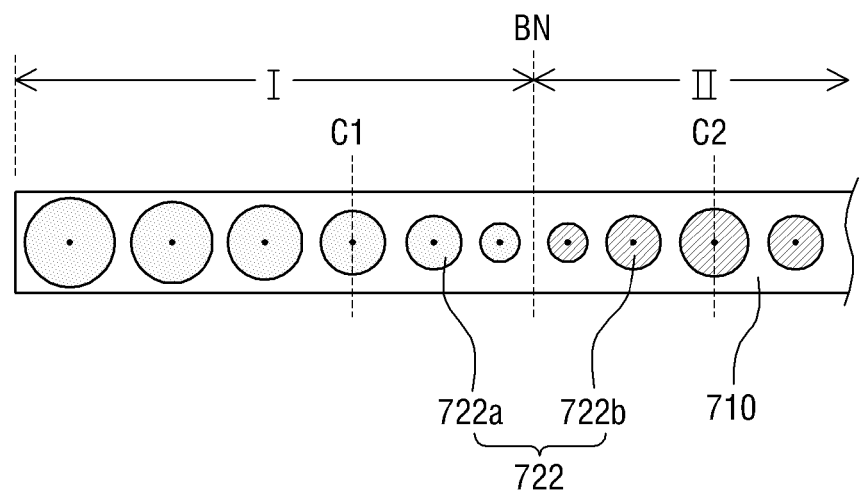

FIGS. 11 and 12 are front views of a side portion and a corner portion of a reflective member 702 according to still another example embodiment. For convenience in explanation, the same reference numerals are used for elements that are substantially the same as the elements illustrated in the above-described drawings, and duplicate explanation thereof will be omitted.

Referring to FIGS. 11 and 12, the shape of a plurality of color patterns 722 may be a circle. That is, a plurality of first color patterns 722a and a plurality of second color patterns 722b are all circular. Further, the gap distance between centers of the plurality of color patterns 722 that are adjacent to each other may be constant.

As described above, the shape of the plurality of color patterns 722 is not limited to a circle, but may be a rectangle, an ellipse, or a triangle. That is, the shape of the plurality of color patterns 722 may be changed in consideration of the degree of arrival of the light emitted from the plurality of light sources 520 at the base layer 710 and easiness of printing.

Figure 13:
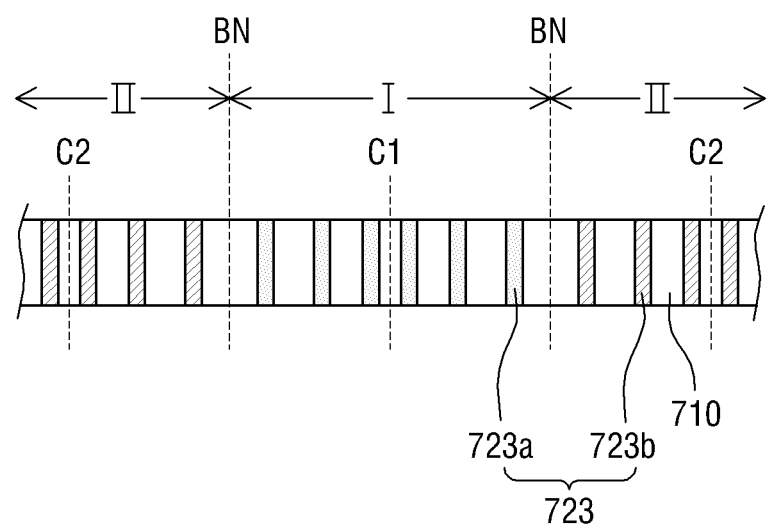
Figure 14:
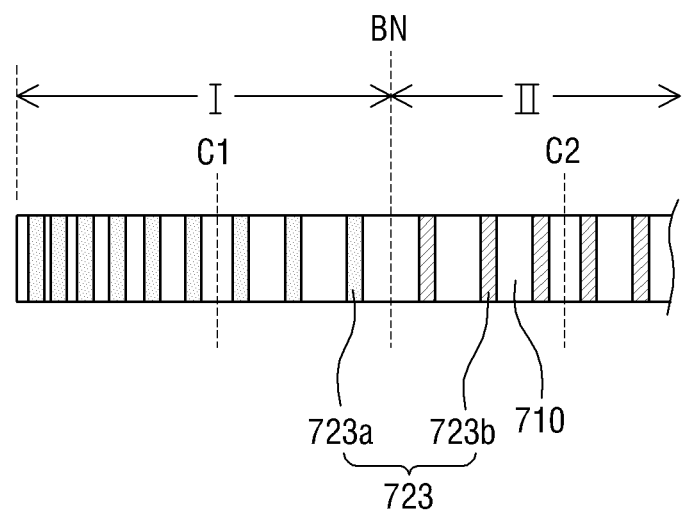

FIGS. 13 and 14 are front views of a side portion and a corner portion of a reflective member 703 according to still another example embodiment. For convenience in explanation, the same reference numerals are used for elements that are substantially the same as the elements illustrated in the above-described drawings, and duplicate explanation thereof will be omitted.

Referring to FIGS. 13 and 14, the widths of a plurality of color patterns 723 may be constant. That is, the widths of a plurality of first color patterns 723a and the widths of a plurality of second color patterns 723b may be constant in all. However, the gap distances between the plurality of color patterns 723 that are adjacent to each other may be different from each other depending on the portions on the base layer 710. Specifically, the gap distance between the adjacent color patterns 723 may be increased as going toward the boundary portion between the first region I and the second region II.

As described above, by adjusting the gap distance between the adjacent color patterns 723 without adjusting the sizes of the plurality of color patterns 723, the color stain can be prevented from occurring on the edge portion ED of the light source portion 500.

Figure 15:
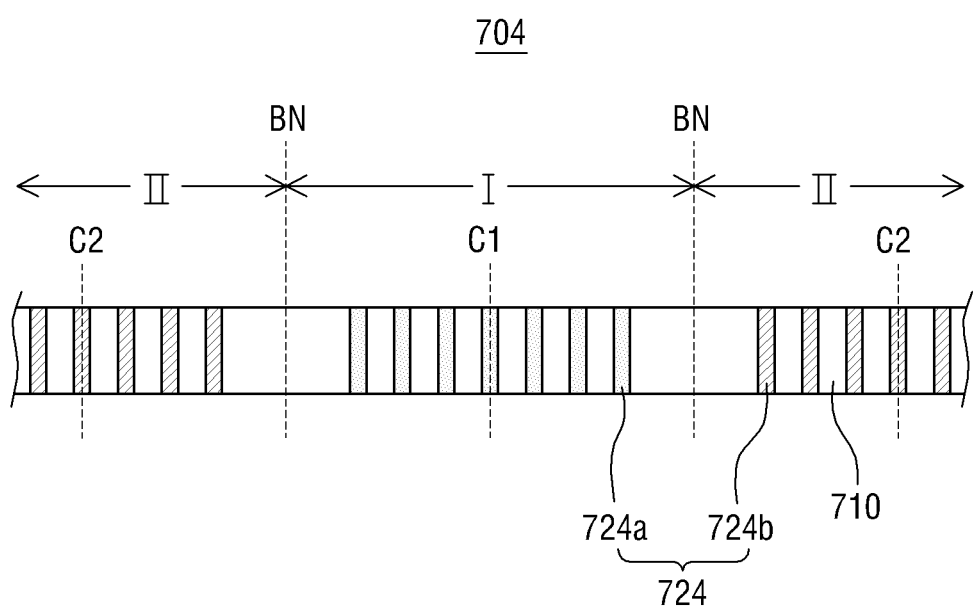
Figure 16:
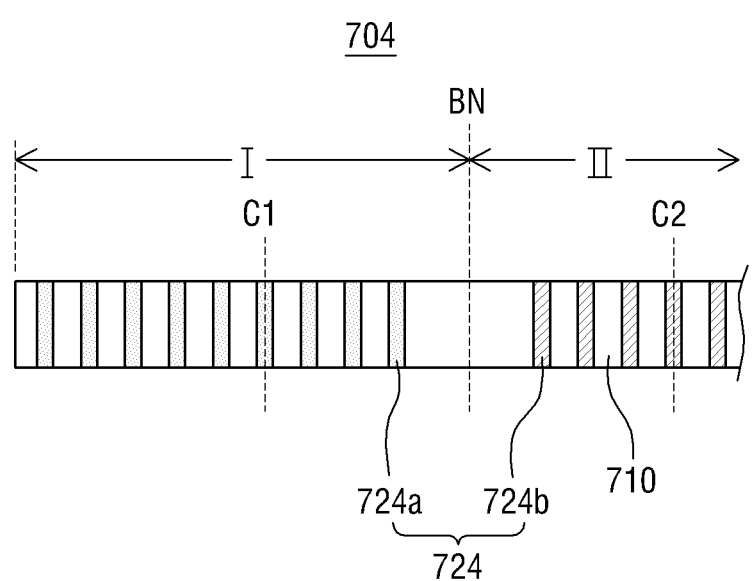

FIGS. 15 and 16 are front views of a side portion and a corner portion of a reflective member 704 according to still another example embodiment. For convenience in explanation, the same reference numerals are used for elements that are substantially the same as the elements illustrated in the above-described drawings, and duplicate explanation thereof will be omitted.

Referring to FIGS. 15 and 16, the widths of a plurality of color patterns 724 may be constant. Further, the plurality of color patterns 724 may be arranged to be spaced apart from each other at equal intervals. Specifically, the gap distance between a plurality of first color patterns 724a that are adjacent to each other may be constant, and the gap distance between a plurality of second color patterns 724b that are adjacent to each other may be constant. However, the gap distance between the first color pattern 724a and the second color pattern 724b that are adjacent to each other may be longer than the gap distance between the plurality of first color patterns 724a that are adjacent to each other and the gap distance between the plurality of second color patterns 724b that are adjacent to each other. In other words, the plurality of color patterns 724 may be spaced apart from each other at equal intervals and may be positioned on the center portions of the first region I and the second region II.

As described above, by arranging the plurality of color patterns 724 so as to be concentrated on the center portions of the first region I and the second region II, which have high possibility that the color stain occurs, the color stain can be prevented from occurring.

Figure 17:
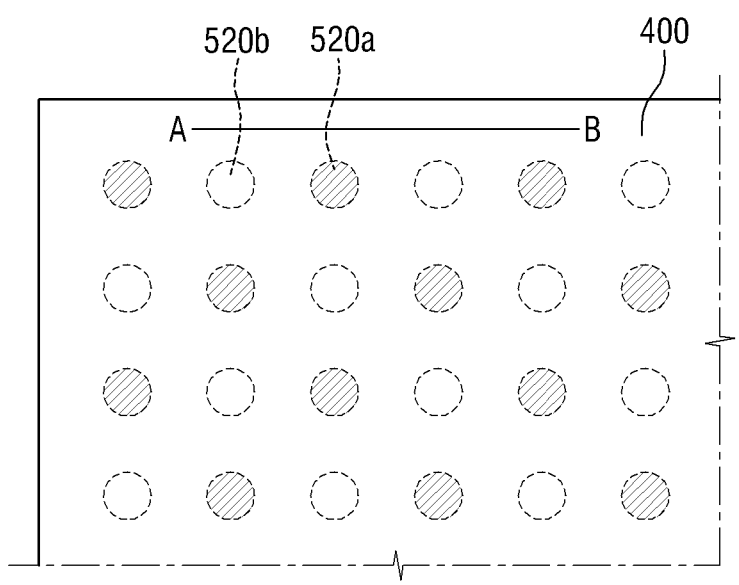
FIG. 17 is a plan view as seen from an optical sheet of a display device adopting a reflective member of FIGS. 15 and 16.

Hereinafter, the color stain prevention effect of a display device that adopts one 704 of the reflective members 700, 701, 702, 703, and 704 according to example embodiments will be described with reference to FIGS. 17 and 18. FIG. 17 is a plan view as seen from an optical sheet of a display device adopting a reflective member of FIGS. 15 and 16, and FIG. 18 is a graph of y-color coordinates before and after the reflective member of FIGS. 15 and 16 is applied to a portion A-B of FIG. 17.

First, in this experiment, top emitting lenses were applied to a plurality of light sources 520. Further, a general diffusion reflective sheet was used as a lower reflective plate 800. The distance d1 measured from the plurality of light sources 520 that are positioned on the edge portion ED of a light source portion 500 to a base layer 710 was 14.8 mm, the gap distance d2 between two adjacent light sources 520 that are positioned on the edge portion ED of the light source portion 500 was 40.7 mm, and the distance d3 measured from the reflective plate 800 to a diffusion plate 600 was 14.6 mm.

Further, the width of a plurality of color patterns 724 in the reflective member 704 illustrated in FIGS. 15 and 16 was 200 µm, the gap distance between the adjacent first color patterns 724a was 350 µm. Further, the gap distance between the adjacent second color patterns 724b was 350 µm, and the gap distance between one first color pattern 724a and one second color pattern 724b, which are adjacent to each other on the boundary portion between the first region I and the second region II was 6 µm. Accordingly, the ratio of an area of the plurality of color patterns 724 to an area of one surface of a base layer 710 was 37%.

Figure 18:
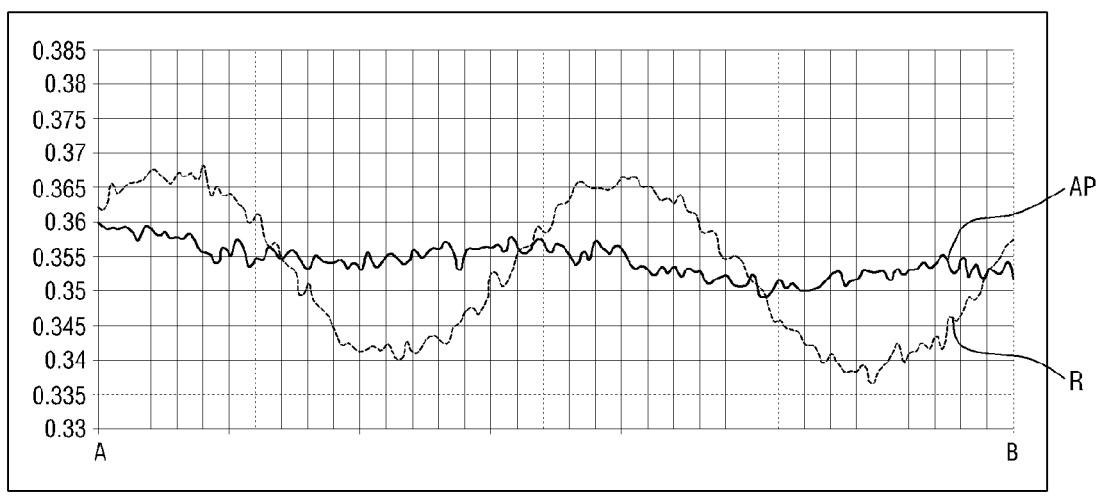
FIG. 18 is a graph of y-color coordinates before and after the reflective member of FIGS. 15 and 16 is applied to a portion A-B of FIG. 17.

Under the above-described conditions, the measured y-color coordinates of A-B portion of FIG. 17 on the optical sheet 400 are shown in the graph of FIG. 18. Referring to FIG. 18, the y-color coordinate graph AP after the reflective member 704 is applied shows an improved stability in comparison to the y-color coordinate graph (Reference, R) before the reflective member 704 is applied. That is, the y-color coordinates of A-B portion after the reflective member 704 is applied have white color almost constantly, and the color stain scarcely appears on the edge portion ED of the light source portion 500.

Although example embodiments have been described for illustrative purposes, those skilled in the art will appreciate that various modifications, additions and substitutions are possible, without departing from the scope and spirit of the present disclosure, including the following claims.

What is claimed is:

1. A backlight assembly comprising:
a light source portion including a plurality of light sources having a first light source and a second light source, the second light source emits light of a color that is different from a color of light emitted from the first light source; and
a reflective member that is adjacent to an edge portion of the light source portion, wherein the reflective member includes:
a base layer including a first region that faces the first light source and a second region that faces the second light source; and
a plurality of color patterns including a plurality of first color patterns that are positioned on the first region of the base layer and a plurality of second color patterns that are positioned on the second region of the base layer,
wherein the plurality of first color patterns and the plurality of second color patterns have different colors,
wherein the color of the plurality of first color patterns is substantially the same as the color of light that is emitted from the second light source, and
the color of the plurality of second color patterns is substantially the same as the color of light that is emitted from the first light source.

2. The backlight assembly of claim 1, wherein the color of the plurality of first color patterns is substantially in a complementary color relationship with the color of the light that is emitted from the first light source, and
the color of the plurality of second color patterns is substantially in a complementary color relationship with the color of the light that is emitted from the second light source.

3. The backlight assembly of claim 2, wherein the color of light emitted from the first light source is magenta, and the color of light emitted from the second light source is green.

4. The backlight assembly of claim 1, wherein the color of the light that is emitted from the first light source and the color of the light that is emitted from the second light source are in a complementary color relationship.

5. The backlight assembly of claim 1, wherein the plurality of color patterns are positioned on one surface of the base layer, and
a ratio of an area of an interface between the base layer and the plurality of color patterns to an area of the one surface of the base layer becomes lower toward a boundary portion between the first region and the second region.

6. The backlight assembly of claim 5, wherein the first light source and the second light source are adjacent to the boundary portion and are spaced apart from the boundary portion by an equal distance.

7. The backlight assembly of claim 1, wherein a size of the plurality of color patterns becomes smaller toward a boundary portion between the first region and the second region.

8. The backlight assembly of claim 7, wherein the plurality of color patterns are circular, and
a gap distance between centers of the plurality of color patterns that are adjacent to each other is constant.

9. The backlight assembly of claim 1, further comprising a diffusion plate that is positioned on the light source portion,
wherein the plurality of color patterns are formed on a region that is adjacent to the diffusion plate.

10. The backlight assembly of claim 1, wherein a gap distance between the plurality of color patterns that are adjacent to each other is increased toward a boundary portion between the first region and the second region.

11. The backlight assembly of claim 1, wherein the plurality of color patterns are spaced apart from each other at equal intervals, and are positioned on center portions of the first region and the second region.

12. The backlight assembly of claim 1, wherein the plurality of light sources are arranged in a matrix shape, and
the first light source and the second light source are alternately arranged in row and column directions.

13. A backlight assembly comprising:
a light source portion including a plurality of light sources having a first light source and a second light source, the second light source emits light of a color that is different from a color of light emitted from the first light source; and
a reflective member that is adjacent to an edge portion of the light source portion,
wherein the reflective member includes:
a base layer including a first region and a second region that is adjacent to the first region; and
a plurality of color patterns including a plurality of first color patterns that are positioned on the first region of the base layer and a plurality of second color patterns that are positioned on the second region of the base layer,
wherein a color of the plurality of first color patterns is substantially in a complementary color relationship with a color of the light that is emitted from the first light source, and
a color of the plurality of second color patterns is substantially in a complementary color relationship with a color of the light that is emitted from the second light source.

14. The backlight assembly of claim 13, wherein the first region faces the first light source, and
the second region faces the second light source.

15. The backlight assembly of claim 13, wherein the color of light emitted by the first light source is magenta, and the color of light emitted by the second light source is green.

16. The backlight assembly of claim 13, wherein the plurality of color patterns are positioned on one surface of the base layer, and
a ratio of an area of an interface between the base layer and the plurality of color patterns to an area of the one surface of the base layer become lower toward a boundary portion between the first region and the second region.

17. A display device comprising:
a display panel displaying an image; and
a backlight assembly providing light to the display panel, wherein the backlight assembly includes:
a light source portion including a plurality of light sources having a first light source and a second light source, the second light source emits light of a color that is different from a color of light emitted from the first light source; and
a reflective member that is adjacent to an edge portion of the light source portion, wherein the reflective member includes:
a base layer including a first region that faces the first light source and a second region that faces the second light source; and
a plurality of color patterns including a plurality of first color patterns that are positioned on the first region of the base layer and a plurality of second color patterns that are positioned on the second region of the base layer,
wherein the plurality of first color patterns and the plurality of second color patterns have different colors,
wherein the color of the plurality of first color patterns is substantially the same as the color of light that is emitted from the second light sources, and
the color of the plurality of second color patterns is substantially the same as the color of light that is emitted from the first light source.

18. The display device of claim 17, wherein the color of the plurality of first color patterns is substantially in a complementary color relationship with the color of light that is emitted from the first light source, and
the color of the plurality of second color patterns is substantially in a complementary color relationship with the color of light that is emitted from the second light source.

19. The display device of claim 18, wherein the color of light emitted by the first light source is magenta, and the color of light emitted by the second light source is green.

* * * * *